United States Patent
Damnjanovic et al.

(10) Patent No.: US 10,470,112 B2
(45) Date of Patent: *Nov. 5, 2019

(54) SMALL CELL ACTIVATION PROCEDURE

(71) Applicant: QUALCOMM INCORPORATED, San Diego, CA (US)

(72) Inventors: Aleksandar Damnjanovic, Del Mar, CA (US); Durga Prasad Malladi, San Diego, CA (US); Siddhartha Mallik, San Diego, CA (US); Naga Bhushan, San Diego, CA (US); Yongbin Wei, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 14/748,204

(22) Filed: Jun. 23, 2015

(65) Prior Publication Data

US 2015/0304944 A1    Oct. 22, 2015

Related U.S. Application Data

(62) Division of application No. 13/830,702, filed on Mar. 14, 2013, now Pat. No. 9,107,056.

(Continued)

(51) Int. Cl.
*H04W 48/00* (2009.01)
*H04W 8/22* (2009.01)
(Continued)

(52) U.S. Cl.
CPC ............ *H04W 48/17* (2013.01); *H04W 8/22* (2013.01); *H04W 24/02* (2013.01);
(Continued)

(58) Field of Classification Search
CPC ........ H04W 48/00; H04W 8/00; H04W 74/00
See application file for complete search history.

(56) References Cited

U.S. PATENT DOCUMENTS 7,385,943 B2    6/2008  Nidda et al.
7,634,277 B2 *  12/2009 Jin .................. H04W 16/02
                                                 455/447

(Continued)

FOREIGN PATENT DOCUMENTS

EP    2180756 A1    4/2010
EP    2536221 A1    12/2012

(Continued)

OTHER PUBLICATIONS

"3rd Generation Partnership Project; Technical Specification Group Radio Access Network; Evolved Universal Terrestrial Radio Access (E-UTRA); Potential solutions for energy saving for E-UTRAN (Release 10)", Sep. 26, 2011 (Sep. 26, 2011), 3GPP Standard; 3GPP TR 36.927, 3rd Generation Partnership Project (3GPP), Mobile Competence Centre ; 650, Route Des Lucioles ; F-06921 Sophia Antipolis Cedex ; France, pp. 1-22, XP050554061, [retrieved on Sep. 26, 2011] paragraph [5.1.2.3].

(Continued)

*Primary Examiner* — Andrew Lai
*Assistant Examiner* — Sumitra Ganguly
(74) *Attorney, Agent, or Firm* — Linda G. Gunderson; Seyfarth Shaw LLP

(57) ABSTRACT

A method of wireless communication includes configuring a small cell with activation parameters. The activation parameters include a new carrier type having a reduced periodicity. The method also includes configuring a UE with time restricted measurements. The time restricted measurements correspond to the new carrier type and the reduced periodicity. The method further includes receiving small cell signal (Continued)

measurements from the UE and initiating an activation sequence in response to the small cell signal measurements.

10 Claims, 12 Drawing Sheets

Related U.S. Application Data

(60) Provisional application No. 61/635,288, filed on Apr. 18, 2012.

(51) Int. Cl.
*H04W 24/02* (2009.01)
*H04W 72/04* (2009.01)
*H04W 74/00* (2009.01)
*H04W 76/28* (2018.01)
*H04W 84/04* (2009.01)
*H04W 88/02* (2009.01)
*H04W 88/08* (2009.01)

(52) U.S. Cl.
CPC ..... *H04W 72/0453* (2013.01); *H04W 74/006* (2013.01); *H04W 76/28* (2018.02); *H04W 84/045* (2013.01); *H04W 88/02* (2013.01); *H04W 88/08* (2013.01)

(56) References Cited

U.S. PATENT DOCUMENTS

| | | | |
|---|---|---|---|
| 8,027,698 | B2 | 9/2011 | Niwano et al. |
| 8,185,116 | B2 | 5/2012 | Wu |
| 8,326,296 | B1 | 12/2012 | O'Neil et al. |
| 2008/0225796 | A1 | 9/2008 | Malladi et al. |
| 2009/0247072 | A1 | 10/2009 | Nakamura |
| 2009/0252073 | A1 | 10/2009 | Kim et al. |
| 2010/0158050 | A1 | 6/2010 | Yang |
| 2010/0167743 | A1* | 7/2010 | Palanki ............ H04B 7/155 455/436 |
| 2010/0182974 | A1 | 7/2010 | Barraclough et al. |
| 2010/0238826 | A1 | 9/2010 | Borran et al. |
| 2010/0260052 | A1* | 10/2010 | Cho ............ H04W 48/16 370/241 |
| 2011/0070880 | A1 | 3/2011 | Song et al. |
| 2011/0096748 | A1* | 4/2011 | Meyer ............ H04W 74/006 370/329 |
| 2011/0164584 | A1 | 7/2011 | Seo et al. |
| 2011/0222428 | A1* | 9/2011 | Charbit ............ H04B 7/15557 370/252 |
| 2011/0267978 | A1 | 11/2011 | Etemad |
| 2011/0268101 | A1 | 11/2011 | Wang et al. |
| 2012/0058797 | A1 | 3/2012 | Gaal et al. |
| 2012/0157099 | A1 | 6/2012 | Matsumoto |
| 2012/0214512 | A1 | 8/2012 | Siomina et al. |
| 2012/0263054 | A1 | 10/2012 | Kazmi et al. |
| 2012/0289178 | A1 | 11/2012 | Matsumura et al. |
| 2012/0289247 | A1 | 11/2012 | Siomina et al. |
| 2012/0302240 | A1 | 11/2012 | Tamaki et al. |
| 2012/0322452 | A1 | 12/2012 | Samuel et al. |
| 2013/0028200 | A1 | 1/2013 | Nory et al. |
| 2013/0195070 | A1* | 8/2013 | Bashar ............ H04W 4/70 370/330 |
| 2013/0242880 | A1* | 9/2013 | Miao ............ H04L 5/001 370/329 |
| 2013/0279430 | A1* | 10/2013 | Damnjanovic ......... H04W 8/22 370/329 |
| 2013/0281076 | A1 | 10/2013 | Damnjanovic et al. |

FOREIGN PATENT DOCUMENTS

| | | | |
|---|---|---|---|
| EP | 2536232 | A1 | 12/2012 |
| JP | 2009246508 | A | 10/2009 |
| WO | 2008137376 | A2 | 11/2008 |
| WO | 2011024476 | A1 | 3/2011 |
| WO | 2011099511 | A1 | 8/2011 |
| WO | 2011099513 | A1 | 8/2011 |
| WO | 2011136152 | A1 | 11/2011 |
| WO | 2012046866 | A1 | 4/2012 |
| WO | 2014021447 | A1 | 2/2014 |

OTHER PUBLICATIONS

International Search Report and Written Opinion—PCT/US2013/032370—ISA/EPO—dated Sep. 3, 2013.
Mitsubishi Electric: "Energy Saving for HeNBs", 3GPP Draft; R3-100201 (EnergysavingforHeNBs), 3rd Generation Partnership Project (3GPP), Mobile Competence Centre; 650, Route Des Lucioles; F-06921 Sophia-Antipolis Cedex; France, vol. RAN WG3, No. Valencia, Spain; Jan. 18, 2010, Jan. 15, 2010 (Jan. 15, 2010), pp. 1-3, XP050424063, [retrieved on Jan. 15, 2010] the whole document.
Motorola Mobility: "Reference and Synchronisation Signals in Additional Carrier Type", 3GPP TSG-RAN WG1#68 R1-120515, Feb. 2, 2012, pp. 1-3, http://www.3gpp.org/ftp/tsg_ran/WG1_RL1/TSGR1_68/Docs/R1-120515.zip.

\* cited by examiner

SMALL CELL ACTIVATION PROCEDURE

CROSS-REFERENCE TO RELATED APPLICATIONS

This application is a divisional of U.S. patent application Ser. No. 13/830,702, entitled "SMALL CELL ACTIVATION PROCEDURE," filed on Mar. 14, 2013, which claims the benefit under 35 U.S.C. § 119(e) to U.S. Provisional Patent Application No. 61/635,288, entitled "RELAY ACTIVATION PROCEDURE," filed on Apr. 18, 2012, the disclosures of which are expressly incorporated by reference herein in their entireties.

The present application is related to U.S. patent application Ser. No. 13/830,747, entitled "SMALL CELL ACTIVATION PROCEDURE," in the names of DAMNJANOVIC et al., filed on Mar. 14, 2013, the disclosure of which is expressly incorporated by reference herein in its entirety.

BACKGROUND

Field

Aspects of the present disclosure relate generally to wireless communication systems, and more particularly to controlling small cell activity states.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect of the present disclosure, a method of wireless communication is disclosed. The method includes configuring a small cell with activation parameters. The method also includes configuring a user equipment (UE) with time restricted measurements. The method further includes receiving small cell signal measurements from the UE. The method also includes initiating an activation sequence in response to the small cell signal measurements.

In another aspect of the present disclosure, a method of wireless communication is disclosed. The method includes receiving activation parameters. The method also includes detecting a proximity of an active UE based at least in part on the activation parameters. The method further includes activating with a new carrier type.

Another configuration discloses an apparatus having means for configuring a small cell with activation parameters. The apparatus also includes means for configuring a UE with time restricted measurements. The apparatus further includes means for receiving small cell signal measurements from the UE. The apparatus also includes means for initiating an activation sequence in response to the small cell signal measurements.

Yet another configuration discloses an apparatus having means for receiving activation parameters. The apparatus also includes means for detecting a proximity of an active UE based at least in part on the activation parameters. The apparatus further includes means for activating with a new carrier type.

In another configuration, a computer program product for wireless communications in a wireless network having a non-transitory computer-readable medium is disclosed. The computer readable medium has program code recorded thereon which, when executed by the processor(s), causes the processor(s) to perform operations of configuring a small cell with activation parameters. The program code also causes the processor(s) to configure a UE with time restricted measurements. The program code further causes the processor(s) to receive small cell signal measurements from the UE. The program code also causes the processor(s) to initiate an activation sequence in response to the small cell signal measurements.

In another configuration, a computer program product for wireless communications in a wireless network having a non-transitory computer-readable medium is disclosed. The computer readable medium has program code recorded thereon which, when executed by the processor(s), causes the processor(s) to perform operations of receiving activation parameters. The program code also causes the processor(s) to detect a proximity of an active UE based at least in part on the activation parameters. The program code further causes the processor(s) to activate with a new carrier type.

Still yet another configuration discloses a wireless apparatus having a memory and at least one processor coupled to the memory. The processor(s) is configured to configure a small cell with activation parameters. The processor(s) is further configured to configure a UE with time restricted measurements. The processor(s) is also configured to receive small cell signal measurements from the UE. The processor(s) is further configured to initiate an activation sequence in response to the small cell signal measurements.

Another configuration discloses a wireless apparatus having a memory and at least one processor coupled to the memory. The processor(s) is configured to receive activation parameters. The processor(s) is also configured to detect a proximity of an active UE based at least in part on the activation parameters. The processor(s) is further configured to activate with a new carrier type.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
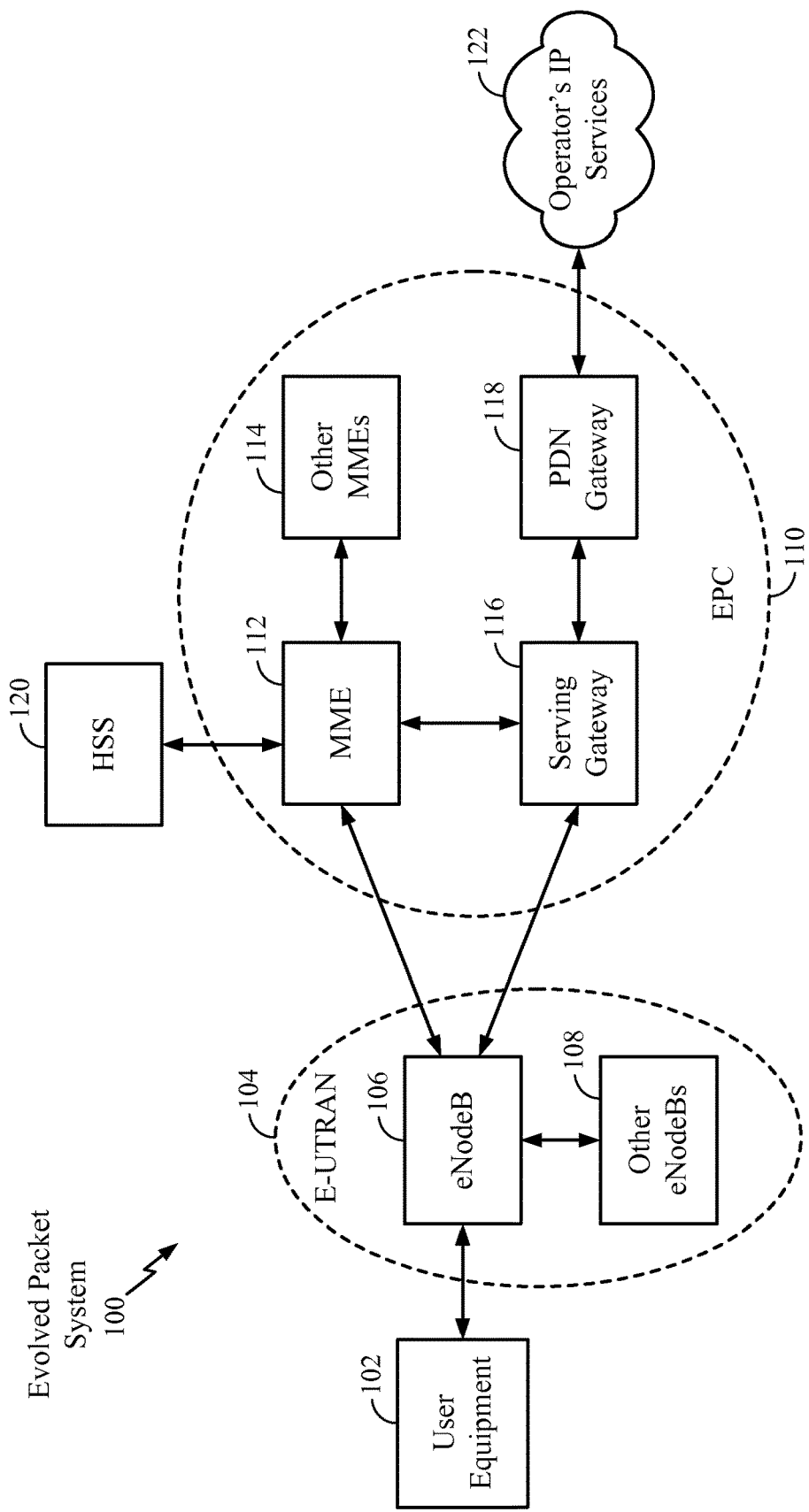
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. For clarity, certain aspects of the techniques are described for LTE or LTE-Advanced (LTE-A) (together referred to as "LTE") and use such LTE terminology in much of the description.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, an access point, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a tablet, a netbook, a smartbook, an ultrabook, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS (packet switched) Streaming Service (PSS).

Figure 2:
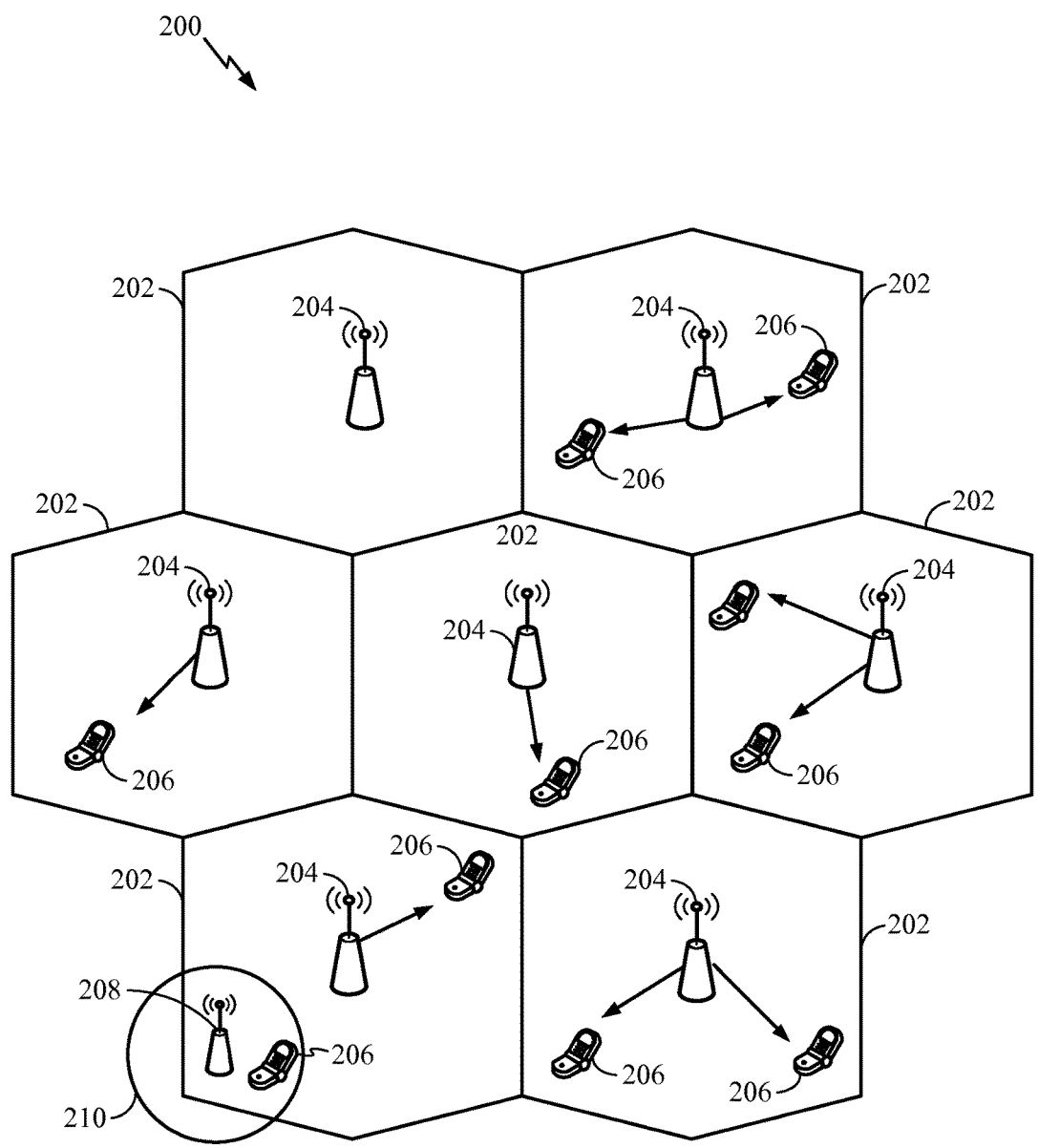
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
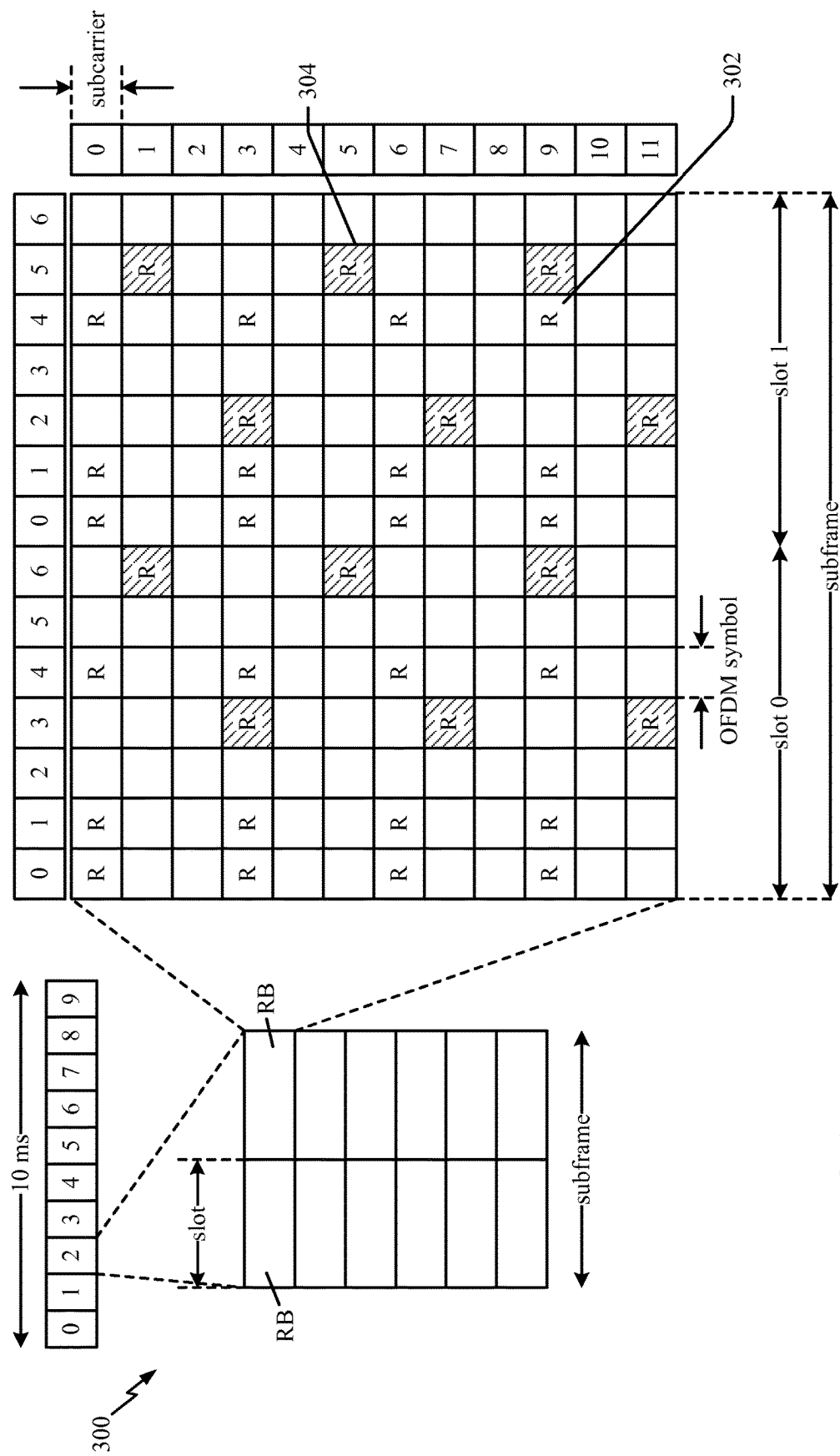
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
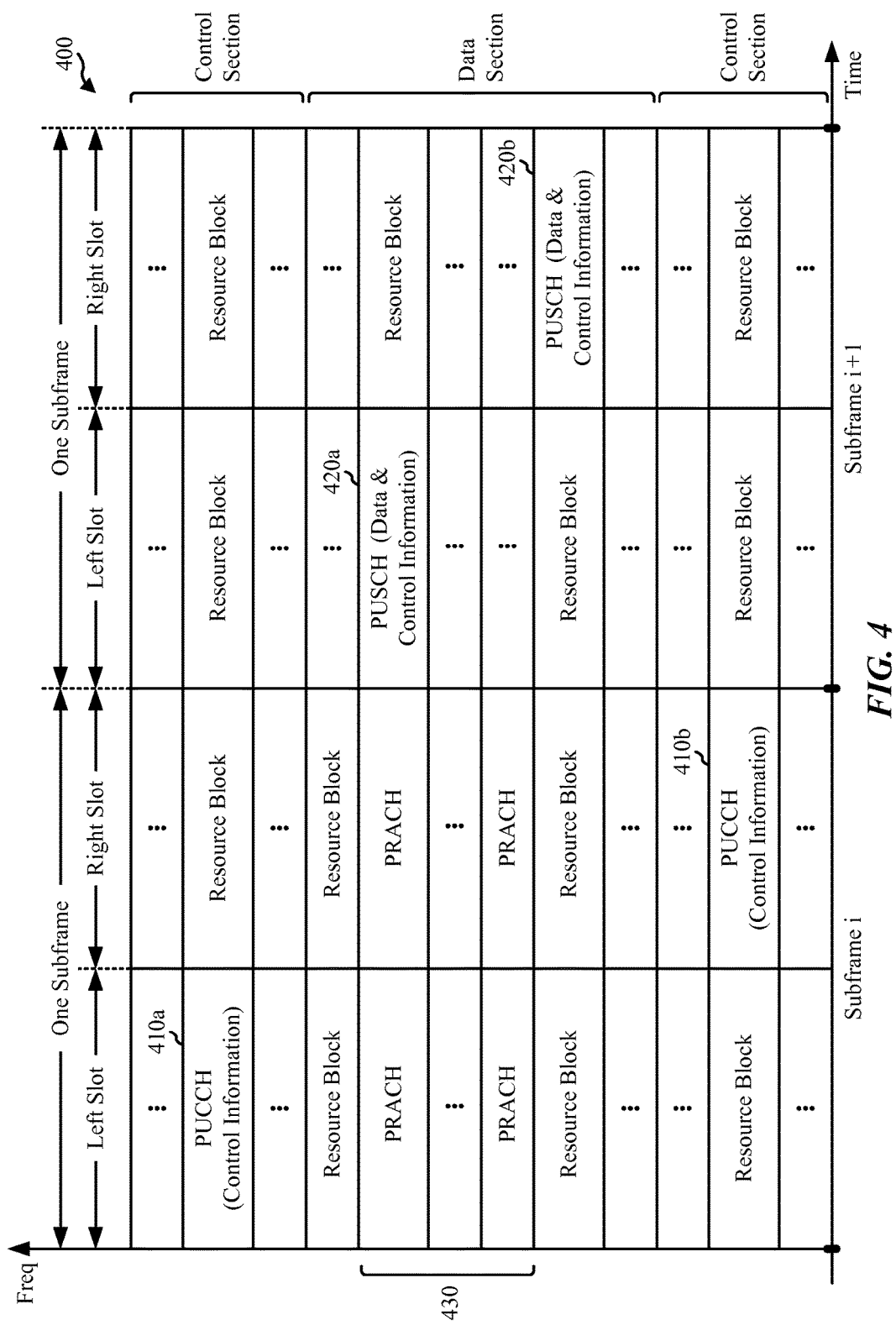
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
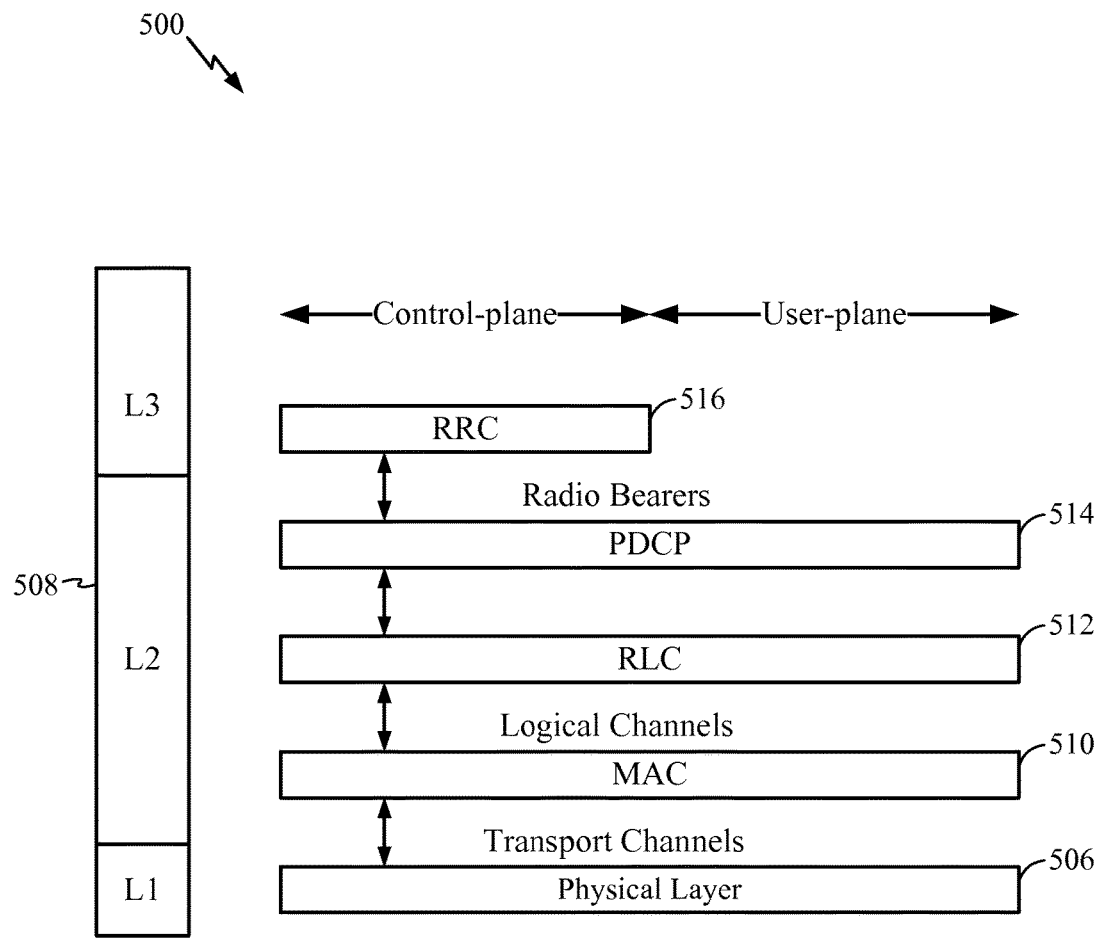
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
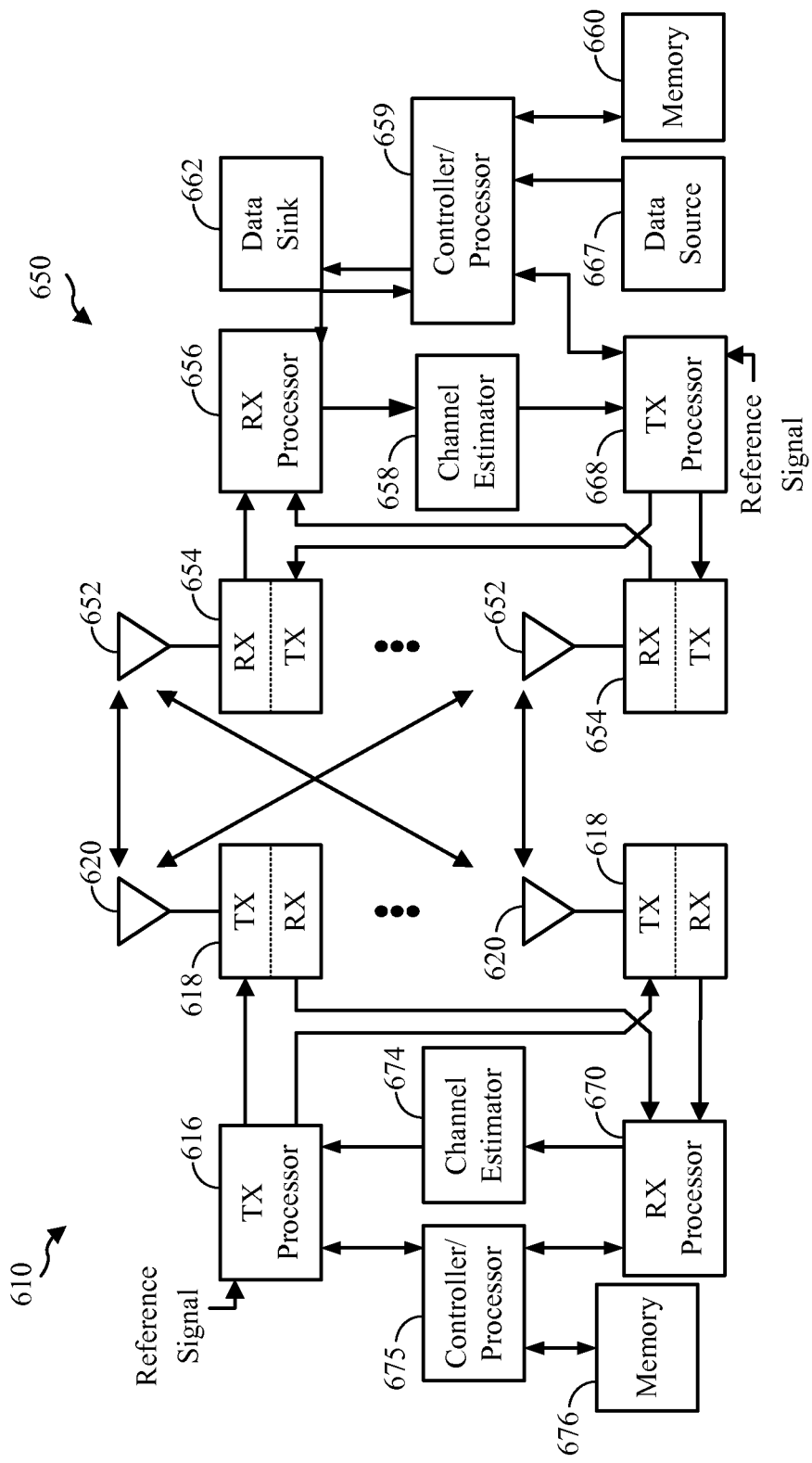
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675, e.g., implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616, e.g., implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter/modulator 618TX. Each transmitter 618TX modulates an RF carrier with a respective spatial stream for transmission.

At the UE 650, each receiver/demodulator 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659, e.g., implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters/modulators 654TX. Each transmitter 654TX modulates an RF carrier with a respective spatial stream for transmission.

The uplink transmission is processed at the eNodeB 610 in a manner similar to that described in connection with the receiver function at the UE 650. Each receiver/demodulator 618RX receives a signal through its respective antenna 620. Each receiver 618RX recovers information modulated onto an RF carrier and provides the information to a RX processor 670. The RX processor 670, e.g., may implement the L1 layer.

The controller/processor 675, e.g., implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controller/processor 675 and the controller/processor 659 may direct the operation at the eNodeB 610 and the UE 650, respectively. The controller/processor 675 or other processors and modules at the eNodeB 610 may perform or direct the execution of various processes for the techniques described herein. The controller/processor 659 or other processors and modules at the UE 650 may also perform or direct the execution of various processes for the techniques described herein. The memory 676 and the memory 660 may store data and program codes for the eNodeB 610 and the UE 650, respectively.

Although the description of FIG. 6 is with respect to the eNodeB 610 and the UE 650, when a small cell is involved, either the apparatus 610 or 650 can be a small cell. For example, if UE to small cell communications are considered, the small cell corresponds to the apparatus 610, and if small cell to eNodeB communications are considered, the small cell corresponds to the apparatus 650.

Figure 7:
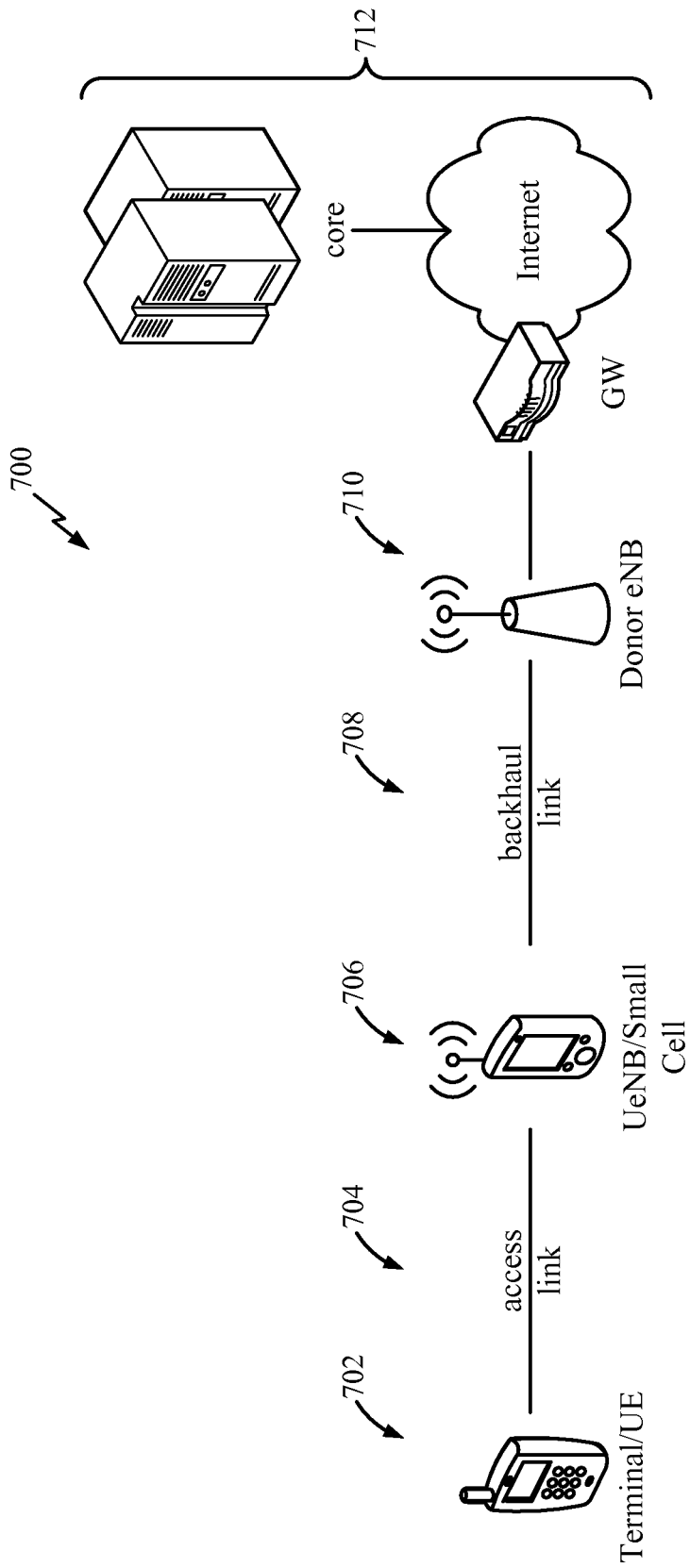
FIG. 7 is a diagram conceptually illustrating an exemplary system according to an aspect of the present disclosure.

FIG. 7 illustrates an exemplary network structure 700. The exemplary network structure 700 may include one or more of a terminal or UE 702, a small cell, relay station, or UeNodeB (UeNB) 706, and a donor eNodeB (DeNB) 710. The UE 702 and UeNB 706 may communicate via an access link 704. Furthermore, the UeNB 706 and eNodeB 710 may communicate via a backhaul link 708. The eNodeB 710 may also be connected to the backend of the network 712. The backend of the network 712 may include a gateway, the internet, and the network core. The small cell may comprise a relay or relay station, an eNodeB, or a UE. The small cell may be a low power node with either a wired or wireless backhaul link.

Aspects of the present disclosure are directed to a small cell activation procedure. More specifically, aspects of the present disclosure are directed to activating small cells based on uplink (UL) transmissions. The uplink transmissions may be physical uplink channel transmissions and may include a random access channel transmission, such as a physical random access channel (PRACH) signature sequence, a reference signal, such as a sounding reference signal (SRS), or another uplink channel.

In another aspect of the present disclosure, the small cell may be activated to use new carrier type (NCT) downlink transmissions from the small cell. The new carrier type specifies that a common reference signal is not transmitted in all subframes and a frequency of other overhead channels, such as a primary synchronization signal (PSS), a secondary synchronization signal (SSS), and a physical broadcast channel (PBCH), is reduced. By transmitting overhead signals at a reduced periodicity (e.g., according to the NCT configuration), overhead signal pollution will be reduced.

When a small cell is activated, a UE may be configured to measure the signal from the small cell on subframes when macro and pico eNodeBs are configured with almost blank subframes. Additionally, UEs may use interference cancellation to detect signals from eNodeBs, detect small cells, perform measurements, report the measurements to the network (e.g., a serving cell such as a macro or pico eNodeB), or a combination thereof.

Figure 8:
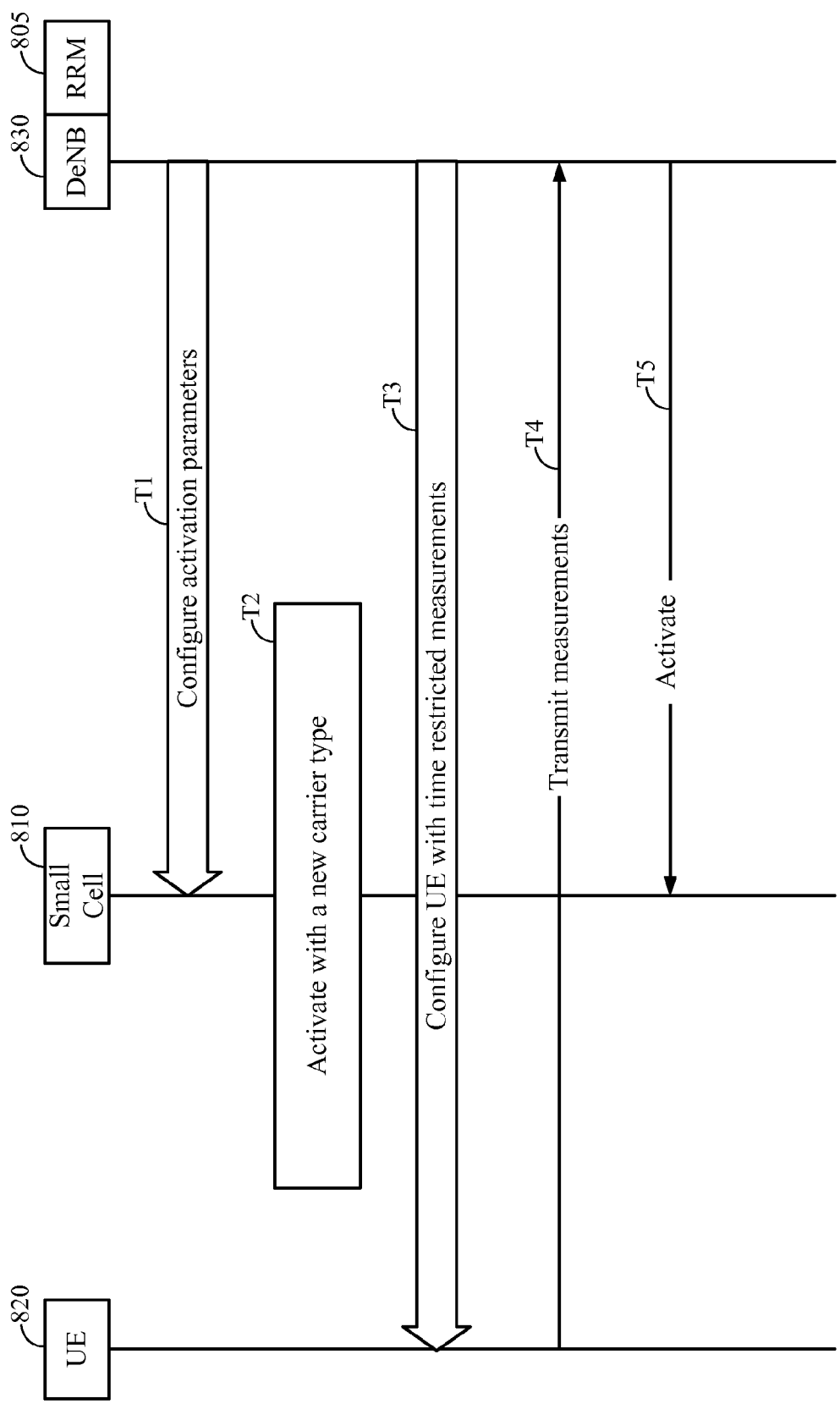
FIG. 8 is a call flow diagram conceptually illustrating an exemplary process according to an aspect of the present disclosure.

FIG. 8 illustrates an exemplary call flow diagram for a small cell activation procedure. In one configuration, the donor eNodeB 830 may include or be coupled to a radio resource management (RRM) server 805. As shown in FIG. 8, at time T1, the donor eNodeB 830 may configure the small cell 810 with activation parameters. For example, the small cell 810 is informed of where to search for the UE 820. The activation parameters may indicate a physical random access channel (PRACH) signature sequence space, time/frequency resources or other uplink transmission signal parameters. The activation parameters may also include an offset specific to the small cell. By transmitting overhead signals with the offset, a UE can distinguish transmissions from different small cells. In another configuration, there is no offset or all small cells have the same offset.

At time T2, the small cell 810 may be activated to transmit a new carrier type (NCT) based on the activation parameters. For example, the activation parameters may configure the small cell 810 to transmit downlink overhead signals with a reduced periodicity. The periodicity can be reduced if radio conditions are satisfied, for example, if the radio conditions are good. The downlink overhead signals may include synchronization signals, such as the primary synchronization signal (PSS) and secondary synchronization signal (SSS), a broadcast channel signal, such as a physical broadcast channel (PBCH), or a combination thereof. After being configured with the activation parameters, the small cell 810 may transmit the downlink signals (not shown). Thus, the UE 820 can detect the small cell 810.

Furthermore, at time T3, the UE 820 is configured to measure downlink transmissions from the small cell 810. That is, the UE 820 is made aware of the periodicity and offset configuration of the small cell. In one configuration, the UE 820 may be configured with restricted resource measurements (e.g., using one of n subframes for measurements). Upon detecting the downlink transmissions from the small cell, at time T4, the UE 820 transmits the measurements to the network. Finally, at time T5, the donor eNodeB 830 may activate the small cell 810 based on the measurements received from the UE.

As shown in FIG. 8, at time T1, the donor eNodeB may define small cell activation procedures. The activation procedures may or may not rely on proximity detection of UEs. In one configuration, N-subframes and a new carrier type (NCT) may be specified for resource restricted measurements. In another configuration, almost blank subframes (ABSs) for pico cells may be specified. Currently, almost blank subframes are not specified for pico cells.

In yet another configuration, a new LTE carrier type may be specified where a common reference signal (CRS) is not present in all subframes. In still yet another configuration, a flexible configuration for channel state information reference signal (CSI-RS) ports may be specified to address a dense small cell deployment. A dense small cell deployment may refer to a scenario when a large number of active small cells are present in small geographical area. The small cells in the dense deployment may be configured to transmit CRS/CSI-RS during macro/pico almost blank subframes to allow UEs to detect these small cells.

The small cell may be configured to transmit overhead signals. In one configuration the overhead signals are transmitted in specific subframes, such as subframes 0/5. In another configuration the overhead signals are transmitted at a lower duty cycle. The small cell may operate in a new carrier type mode such that the overhead signals are transmitted at a lower duty cycle. In one configuration, transmission of reference signals, such as a common reference signal or a channel state information reference signal, may span multiple measurement instances (e.g., five bursts in 200 ms, spaced apart every 40 ms).

Typically, each small cell may transmit the overhead signals or reference signals with a configurable periodicity. That is, each small cell may have a separate configuration. The periodicity of the overhead signals and the reference signals may be reduced in comparison to a typical LTE schedule, such as the schedule of LTE Release 11. According to one configuration, pseudo random transmissions may be specified for the transmissions of the overhead signals or reference signals.

In one configuration, the small cell activation may be network controlled. That is, as shown in FIG. 8, UEs may detect small cells and report measurements to the donor eNodeB. The donor eNodeB may activate specific small cells based on reports received from one or more UEs. Still, in another configuration, the small cell activation may be autonomous.

Figure 9:
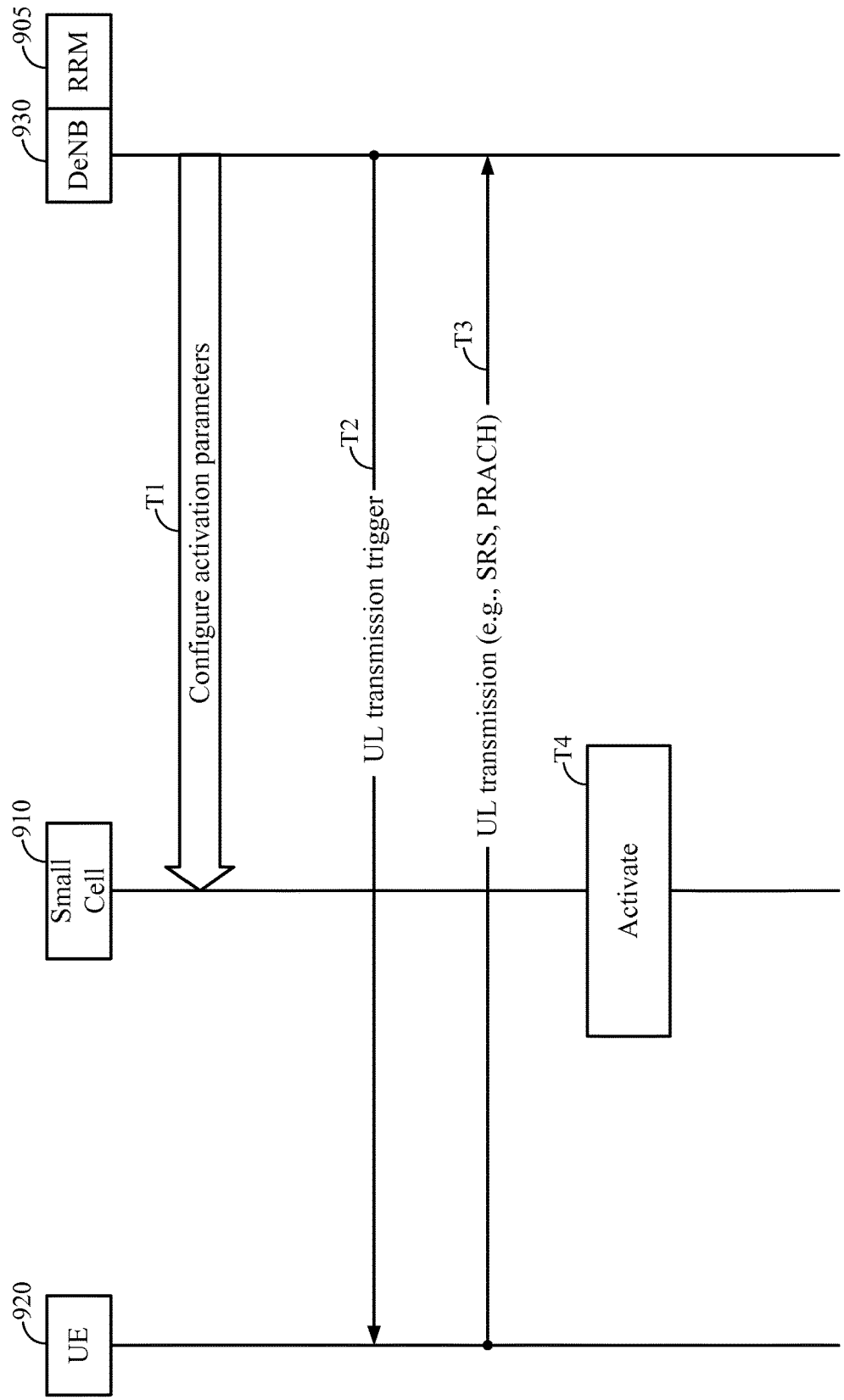
FIG. 9 is a call flow diagram conceptually illustrating an exemplary process according to an aspect of the present disclosure.

FIG. 9 illustrates an exemplary call flow diagram for defining an autonomous small cell activation procedure using UE transmissions according to an aspect of the present disclosure. As illustrated in FIG. 9, in one configuration, the donor eNodeB 930 may include a radio resource management (RRM) server 905. In another configuration, the donor eNodeB 930 may be coupled to the RRM server 905. At time T1, the donor eNodeB 930 may configure the small cell 910 with activation parameters. The activation parameters may indicate physical uplink transmissions of a UE 920. Specifically, the small cell 910 may use activation parameters included in the physical uplink transmissions to detect a UE's proximity. The physical uplink transmissions may include random access channel transmissions, such as a physical random access channel signature sequence, or reference signals, such as a sounding reference signal.

In one configuration, the donor eNodeB 930 may trigger the UE 920 to transmit on the physical uplink channel. For example, at time T2, the donor eNodeB 930 may transmit a control channel order, such as a physical downlink control channel (PDCCH) order, to trigger a random access channel transmission or a reference signal transmission from the UE 920. Alternatively, the uplink transmission may be semi-statically configured.

In response to receiving the uplink trigger or semi-static configuration, at time T3, the UE 920 may transmit a signal, such as the random access channel transmission or a reference signal transmission. At time T4, the small cell 910 may detect the uplink transmission from the UE. If the uplink transmission satisfies thresholds, such as uplink threshold values provided in the activation parameters, the small cell 910 may initialize autonomous activation. In one configuration, the small cell 910 may be activated with a reduced periodicity. In another configuration, the small cell 910 may be activated with the reduced periodicity of the new carrier type.

According to another configuration, the UE only transmits the random access channel signature sequence and does not continue with the random access procedure. That is, the UE does not monitor for a random access response from the donor eNodeB. This may be achieved with an uplink trigger, such as a downlink control channel order, or without an uplink trigger so that the transmission is periodic (e.g., periodic random access channel based sounding). According to another configuration, the donor eNodeB does not proceed with the typical random access channel procedure in response to receiving the random access channel transmission from the UE. The random access channel transmission may be transmitted with full transmit power or with a power level determined by a power control algorithm towards the serving cell that triggered random access channel transmission.

For example, in FIG. 9, as previously discussed, the donor eNodeB 930 may transmit a control channel order to trigger a random access channel transmission or a reference signal transmission from the UE 920. In response to receiving the uplink trigger or semi-static configuration, at time T3, the UE 920 transmits a signal, such as the random access channel transmission or a reference signal transmission. In one configuration, the random access channel transmission of the UE 920 does not trigger the typical random access channel procedure at the donor eNodeB 930.

Figure 10:
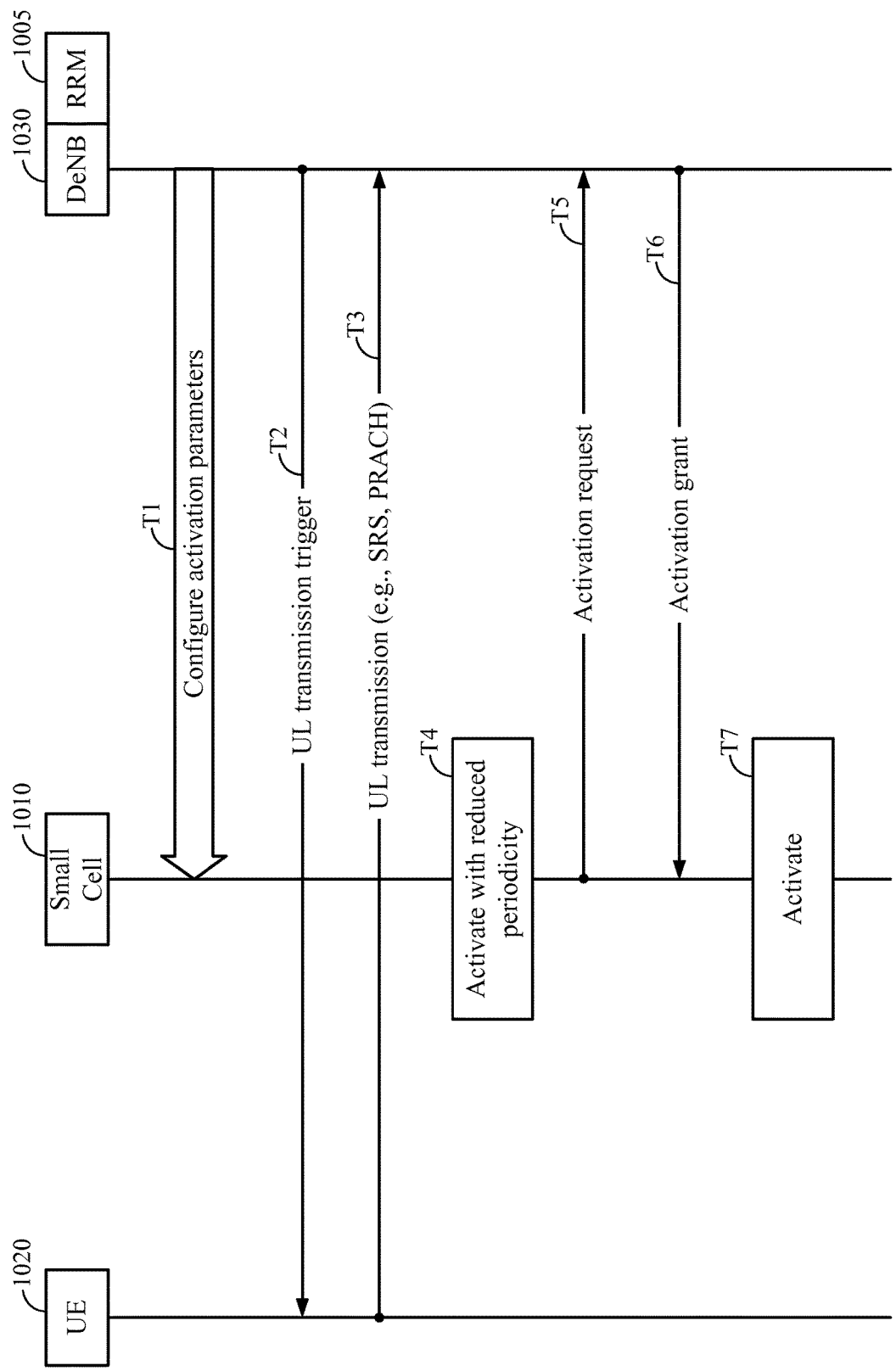
FIG. 10 is a call flow diagram conceptually illustrating an exemplary process according to an aspect of the present disclosure.

FIG. 10 illustrates an exemplary call flow diagram for defining an autonomous small cell activation procedure according to an aspect of the present disclosure. As illustrated in FIG. 10, the donor eNodeB 1030 may include or be coupled to a radio resource management server 1005. At time T1, the donor eNodeB 1030 may configure the small cell 1010 with activation parameters. The activation parameters may indicate physical uplink transmissions, such as a random access channel transmission or a reference signal transmission, of a UE 1020. Specifically, the small cell 1010 may use activation parameters included in the physical uplink transmissions to detect a UE's proximity.

In one configuration, the donor eNodeB 1030 may trigger the UE 1020 to transmit on the physical uplink channel. For example, the donor eNodeB 1030 may transmit a control channel order, such as a PDCCH order, at time T2, to trigger the transmission of a signature sequence, such as a PRACH signature sequence, or reference signal, such as a SRS, from the UE 1020. Alternatively, the uplink transmission may be semi-statically configured.

In response to receiving the uplink trigger or a semi-static configuration, the UE 1020 may transmit a signal, such as the signature sequence or the reference signal, on a physical channel at time T3. At time T4, the small cell 1010 may detect the transmission from the UE. If the uplink transmission from the UE 1020 is equal to or greater than a threshold, such as uplink threshold values provided in the activation parameters, the small cell 1010 may begin autonomous activation. In one configuration, the small cell 1010 is activated with a first reduced periodicity. In another configuration, the small cell 1010 may also be activated with the new carrier type.

Moreover, at time T5, after being activated with a reduced periodicity, the small cell 1010 may initiate network activation. Specifically, the small cell 1010 may transmit an activation request to the donor eNodeB 1030. The activation request may include the detected measurements of uplink transmissions from the UE. In response to receiving the activation request, at time T6, the donor eNodeB 1030 may transmit an activation grant to the small cell 1010. The activation grant may activate the small cell with a second periodicity, at time T7. The second periodicity may be a full periodicity. According to one configuration, the small cell 1010 may bypass the activation at time T4 and proceed to network activation at time T5.

As discussed above, according to one aspect of the present disclosure, the donor eNodeB may configure the small cell to detect specific activation parameters. The activation parameters may enable the small cell to detect the UE's proximity. These parameters may include random access channel transmissions, time/frequency resources, reference signals, or other uplink transmissions. For random access channel transmissions parameters, such as a physical random access channel parameter, the small cell may be configured based on the physical random access channel configuration of a serving cell. Furthermore, in one configuration, the small cell may also be configured based on the physical random access channel configuration of one or more neighboring cells. The activation parameters may also include threshold values. For example, the threshold value may include a minimum signal strength. That is, when the detected signal strength of a UE is above the threshold, the small cell may be activated because the UE is within a specific distance from the small cell. In another configuration, the thresholds may include an interference threshold.

As illustrated in FIGS. 9 and 10, the donor eNodeB may dynamically trigger the UE to transmit a reserved set of signature sequences, time resources, frequency resources, or a combination thereof, via an uplink signal. The triggering may be based on criteria observed by the donor eNodeB, such as data load or radio conditions. For example, the donor eNodeB may only transmit the uplink trigger for UEs with a high downlink data load and when the network is loaded. Alternatively, the donor eNodeB may semi-statically configure a periodic or event based trigger for uplink transmissions during network setup.

In one configuration, the network may transmit an activation grant in response to receiving the activation request from the small cell. In this configuration, the RRM server may determine that a group of small cells have detected the same UE. Typically, multiple small cells are not activated for the same UE. Thus, the RRM server may transmit the activation request to other RRM servers associated with neighboring donor eNodeBs to coordinate the activation grants. Alternatively, according to another configuration, one RRM server may be associated with multiple donor eNodeBs, and therefore, the RRM server does not coordinate with other RRM servers. The small cell may be activated and start a power ramp up procedure after receiving the activation grant.

Upon activation of a small cell, the small cell may be configured to transmit overhead signals that are different from the overhead signals used by the donor eNodeB. In another configuration, the overhead signals used by the small cell may be the same as the overhead signals used by the donor eNodeB. When the overhead signals used by the small cell are the same as the overhead signals of the donor eNodeB, the small cell may appear as the same cell as the donor eNodeB. Moreover, when the overhead signals are different from the overhead signals of the eNodeB, the small cell may appear as a different cell. Furthermore, when the overhead signals of the small cell and the eNodeB are the same, the small cell may have a unique global cell ID. Alternatively, the small cell may have a global cell ID that is the same as the donor eNodeB's global cell ID. Furthermore, the small cell may have different configured antenna ports. In the latter scenario, the small cell may appear as an extension of a donor eNodeB. In one configuration, unique CSI-RS ports (e.g., CSI-ports that are different from donor eNodeB and neighboring UE small cells) may be configured for the purpose of radio resource management and channel state information feedback. If CSI-RS transmissions are configured to be different for each small cell, it becomes less likely that resources will collide.

As previously discussed, according to one configuration, a network may configure a small cell station with activation parameters. The activation parameters may include uplink parameters for detecting a UE. In another configuration, the activation parameters may include downlink parameters, such as downlink radio conditions for determining whether a signal strength, interference, or a combination thereof, is within a threshold. That is, the downlink parameters may include a reference signal received power (RSRP), reference signal received quality (RSRQ), or signal to interference plus noise ratio (SINR). The small cell may be activated when downlink parameters meet a threshold. In one configuration, the activation parameters may only include the downlink parameters. Alternatively, the activation parameters may include both the downlink parameters and the uplink parameters.

Furthermore, in another configuration, the network may configure the small cell station to transmit downlink overhead signals with a reduced periodicity and a subframe/resource block offset, O_tf_1. In one configuration, the reduced periodicity may be infinity. That is, the reduced periodicity may effectively equal zero transmissions. The downlink overhead signals may include a primary synchronization signal, a secondary synchronization signal, a physical broadcast channel, or a combination thereof.

As previously discussed, the UE may detect the transmitted downlink overhead signals and may transmit the detected measurements to the donor eNodeB. In one configuration, the small cell may use the new carrier type. Furthermore, in another configuration, the small cell may transmit downlink overhead signals even if the small cell does not detect a UE. In yet another configuration, because many small cells may be detected by the UE, each small cell may have a different offset to distinguish the small cells.

Moreover, in still yet another configuration, the overhead signal transmissions of the small cell may be the same as overhead signal transmissions of the donor eNodeB in order to obtain a single frequency network (SFN) effect for time/frequency tracking. In this case, the offset is the same for all small cells. Alternatively, the overhead signal transmissions of the small cell may be different from the overhead signal transmissions of the donor eNodeB. In one configuration, when CSI-RS transmissions are configured for a small cell, overhead signal transmissions may be different for each small cell station. Furthermore, in one configuration, the interference measurement report (IMR) resources may also be different for each small cell station.

Moreover, in one configuration, a UE may be configured to measure downlink transmissions from the small cell. The UE may be aware of the transmission periodicity and offset if the small cell is configured for reduced transmission with such offset. Furthermore, the UE may be configured with restricted measurements. That is, for example, the UE may be configured to use one subframe out of n subframes for the downlink transmission measurements.

As illustrated in FIGS. 9 and 10, at time T2, the donor eNodeB may dynamically or semi statically trigger uplink transmissions from the UE for uplink sounding purposes. Furthermore, at time T3, a UE may transmit uplink signals as configured/triggered by donor eNodeB. Additionally, if the small cell detects the uplink transmissions at time T4, the small cell may change its periodicity and offset. For example, the offset may be O_tf_2 and the periodicity may be infinity. That is, the periodicity may effectively equal zero transmissions. In one configuration, the changing of the periodicity and offset of time T4 may be optional in the call flow of FIG. 8. In another configuration, the small cell may autonomously activate upon detecting the uplink transmission from the UE.

As illustrated in FIG. 10, in one configuration, at time T5, the small cell may transmit an activation request to the donor eNodeB or radio resource management server when the small cell detects an uplink signal from a UE. The activation request may include an uplink signal measurement report that includes a measurement object, such as a random access channel transmission or a reference signal. The activation request may also include other measurement attributes, such as a deselected sequence, signal strength, and signal quality (e.g., SNIR).

Moreover, at time T6, the small cell may receive an activation grant. The activation grant may include updated downlink transmission parameters. The RRM server may determine that a group of small cells have detected the same UE. Thus, the RRM server may transmit activation request information to other RRM servers associated with neighboring donor eNodeBs to coordinate activation grants. Alternatively one RRM server may be associated with multiple donor eNodeBs, and therefore, the RRM server may not coordinate with other RRM servers.

In another configuration, at time T7, the small cell may autonomously proceed to the activation process. Specifically, the small cell may autonomously proceed to the activation process if the activation criteria configured at time T1 is met. Furthermore, at time T7, the small cell may change its periodicity and offset. For example, the offset may be changed to O_tf_3 and the periodicity may be a non-infinite value. That is, based on the non-infinite periodicity, the small cell may have downlink activity.

Figure 11:
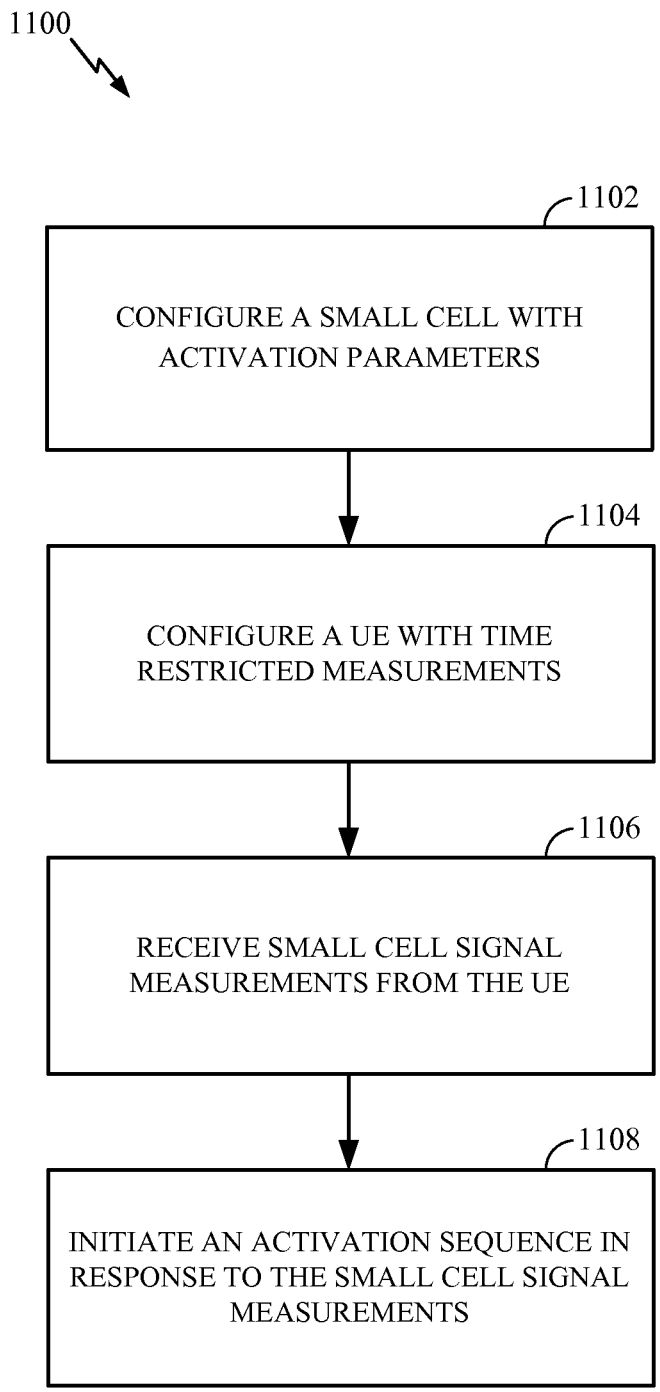
FIG. 11 is a block diagram illustrating a method for activating a small cell according to an aspect of the present disclosure.

FIG. 11 illustrates a method 1100 for activating a small cell. In block 1102, a base station configures a small cell with activation parameters. The activation parameters can include a reduced periodicity, as with a new carrier type. The base station configures a UE with time restricted measurements in block 1104. The time restricted measurements may correspond to the new carrier type and the reduced periodicity. Furthermore, in block 1106, the base station receives small cell signal measurements from the UE. Finally, in block 1108 the base station initiates an activation sequence in response to the small cell signal measurements.

In one configuration, the eNodeB 610 is configured for wireless communication including means for configuring. In one aspect, the configuring means may include the controller/processor 675, memory 676, transmit processor 616, modulators 618 and/or antenna 620, configured to perform the functions recited by the configuring means. The eNodeB 610 is also configured to include a means for receiving. In one aspect, the receiving means may include the receive processor 670, demodulators 618, controller/processor 675 and/or antenna 620 configured to perform the functions recited by the receiving means. The eNodeB 610 is also configured to include a means for initiating. In one aspect, the initiating means may include the controller/processor 675, memory 676, transmit processor 616, modulators 618, and/or antenna 620 configured to perform the functions recited by the initiating means. In another aspect, the aforementioned means may be any module or any apparatus configured to perform the functions recited by the aforementioned means.

Figure 12:
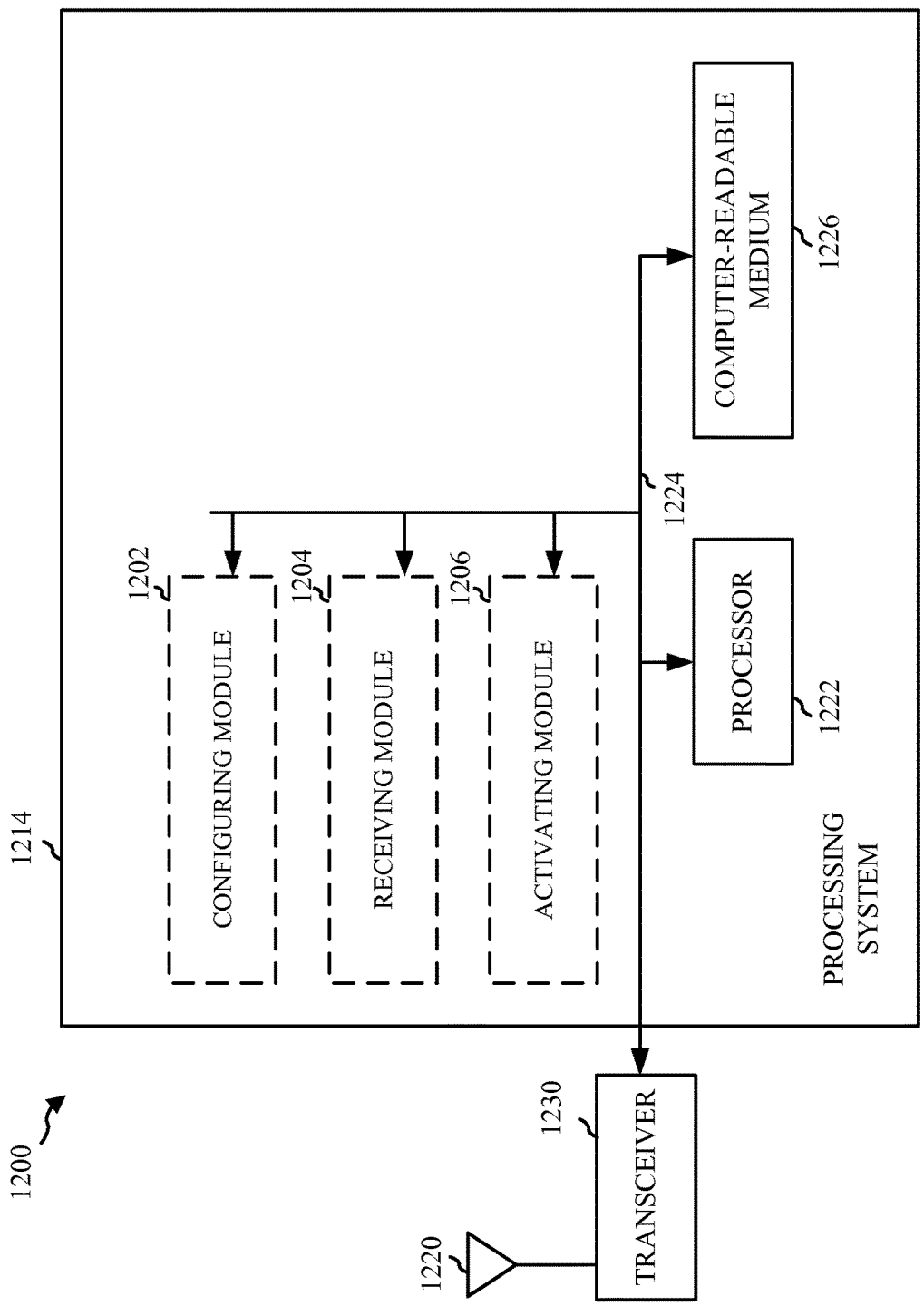
FIG. 12 is a block diagram illustrating different modules/means/components in an exemplary apparatus.

FIG. 12 is a diagram illustrating an example of an implementation (e.g., a hardware implementation) for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various modules/circuits including one or more processors and/or modules (e.g., hardware modules), represented by the processor 1222, the modules 1202, 1204, 1206, and the computer-readable medium 1226. The bus 1224 may also link various other modules/circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system 1214 includes a configuring module 1202 for configuring a small cell with activation parameters, the activation parameters including a reduced periodicity, such as with a new carrier type. The configuring module 1202 may also configure a UE with time restricted measurements, the time restricted measurements corresponding to the new carrier type and the reduced periodicity. The processing system 1214 also includes a receiving module 1204 for receiving small cell signal measurements from the UE. The processing system 1214 may further include an activating module 1206 for initiating an activation sequence in response to the small cell signal measurements. The modules may be software modules running in the processor 1222, resident/stored in the computer-readable medium 1226, one or more hardware modules coupled to the processor 1222, or some combination thereof. The processing system 1214 may be a component of the eNodeB 610 and may include the memory 676, and/or the controller/processor 675.

Those of skill would further appreciate that the various illustrative logical blocks, modules, circuits, and algorithm steps described in connection with the disclosure herein may be implemented as hardware, software, or a combination thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, PCM (phase change memory), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored, encoded as one or more instructions or code, or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a small cell, activation parameters;
   detecting, at the small cell, an uplink signal of an active user equipment (UE) based at least in part on the activation parameters, the uplink signal triggered by a downlink control channel order from a base station, in which the uplink signal comprises a physical random access channel (PRACH) signature sequence that does not initiate a random access procedure at the active UE or the base station;
   determining, at the small cell, whether at least one of a signal strength, an interference level, or a combination thereof, of the uplink signal of the active UE meet a threshold identified in the activation parameters; and activating the small cell with a new carrier type based on determining that at least one of the signal strength, the interference level, or the combination thereof, of the uplink signal meet the threshold, a periodicity of synchronization signals transmitted according to the new carrier type being less than a periodicity of synchronization signals transmitted according to a legacy carrier type.

2. The method of claim 1, further comprising transmitting an activation request when the active UE is detected.

3. The method of claim 2, further comprising:
receiving an activation grant with updated downlink transmission parameters; and
activating with the updated downlink transmission parameters.

4. An apparatus for wireless communications, comprising:
a memory; and
at least one processor coupled to the memory, the at least one processor being configured to:
receive, at a small cell, activation parameters;
detect, at the small cell, an uplink signal of an active user equipment (UE) based at least in part on the activation parameters, the uplink signal triggered by a downlink control channel order from a base station, in which the uplink signal comprises a physical random access channel (PRACH) signature sequence that does not initiate a random access procedure at the active UE or the base station;
determine, at the small cell, whether at least one of a signal strength, an interference level, or a combination thereof, of the uplink signal of the active UE meet a threshold identified in the activation parameters; and
activate the small cell with a new carrier type based on determining that at least one of the signal strength, the interference level, or the combination thereof, of the uplink signal meet the threshold, a periodicity of synchronization signals transmitted according to the new carrier type being less than a periodicity of synchronization signals transmitted according to a legacy carrier type.

5. The apparatus of claim 4 in which the at least one processor is further configured to transmit an activation request when the active UE is detected.

6. The apparatus of claim 5, in which the at least one processor is further configured to:
receive an activation grant with updated downlink transmission parameters; and
activate with the updated downlink transmission parameters.

7. An apparatus for wireless communications, comprising:
means for receiving, at a small cell, activation parameters;
means for detecting, at the small cell, an uplink signal of an active user equipment (UE) based at least in part on the activation parameters, the uplink signal triggered by a downlink control channel order from a base station, in which the uplink signal comprises a physical random access channel (PRACH) signature sequence that does not initiate a random access procedure at the active UE or the base station;

means for determining, at the small cell, whether at least one of a signal strength, an interference level, or a combination thereof, of the uplink signal of the active UE meet a threshold identified in the activation parameters; and means for activating the small cell with a new carrier type based on determining that at least one of the signal strength, the interference level, or the combination thereof, of the uplink signal meet the threshold, a periodicity of synchronization signals transmitted according to the new carrier type being less than a periodicity of synchronization signals transmitted according to a legacy carrier type.

8. The apparatus of claim 7, further comprising means for transmitting an activation request when the active UE is detected.

9. The apparatus of claim 8, further comprising:
means for receiving an activation grant with updated downlink transmission parameters; and
means for activating with the updated downlink transmission parameters.

10. A non-transitory computer-readable medium having program code recorded thereon, the program code comprising:
program code to receive, at a small cell, activation parameters;
program code to detect, at the small cell, an uplink signal of an active user equipment (UE) based at least in part on the activation parameters, the uplink signal triggered by a downlink control channel order from a base station, in which the uplink signal comprises a physical random access channel (PRACH) signature sequence that does not initiate a random access procedure at the active UE or the base station;
program code to determine, at the small cell, whether at least one of a signal strength, an interference level, or a combination thereof, of the uplink signal of the active UE meet a threshold identified in the activation parameters; and
program code to activate the small cell with a new carrier type based on determining that at least one of the signal strength, the interference level, or the combination thereof, of the uplink signal meet the threshold, a periodicity of synchronization signals transmitted according to the new carrier type being less than a periodicity of synchronization signals transmitted according to a legacy carrier type.

\* \* \* \* \*